Dec. 6, 1938.         D. McKERCHER ET AL         2,139,555
                    METHOD OF MAKING BEARINGS
                    Original Filed Dec. 16, 1935

INVENTORS
DANIEL McKERCHER
GEORGE F. YAGER
BY
ATTORNEYS

Patented Dec. 6, 1938

2,139,555

UNITED STATES PATENT OFFICE 2,139,555

METHOD OF MAKING BEARINGS

Daniel McKercher and George F. Yager, Toledo, Ohio, assignors to The Bunting Brass and Bronze Company, Toledo, Ohio, a corporation of Ohio Original application December 16, 1935, Serial No. 54,746. Divided and this application February 15, 1937, Serial No. 125,855

6 Claims. (Cl. 29—149.5)

This invention relates generally to an improved method of manufacturing bearings or bearing box liners and constitutes a divisional application of our application Serial No. 54,746 filed December 16, 1935.

Heretofore it has been customary to form bearings of the type mentioned in half sections and to provide such sections with some means for interlocking engagement with the bearing boxes or housings in which they were placed to prevent such bearings from turning or rotating. For example, one or both sections of the bearing have been provided with struck-out tongues for engagement with suitable recesses in the bearing boxes. However, in use such tongues are often times bent or sheared and thus permit movement of the bearing sections relative to the bearing boxes. Hence, such constructions have proven unsatisfactory. Moreover, such constructions not only transfer the wearing surface from the journal to the box or housing, but also by movement of the bearing relative to the box or housing the oil port in the bearing is moved out of registration with the oil passage in the box and causes the supply of lubricant to be cut off.

Therefore, it is an object of the present invention to construct a bearing or liner in such a manner that it will at all times remain stationary relative to the box or housing in which it is placed.

Another object is to provide an improved method of manufacturing bearings of the type mentioned.

Figure 1:
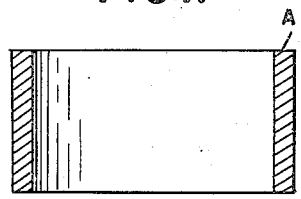
Figure 1 is an axial section through the annular blank from which the bearing shell is formed.
Figure 2:
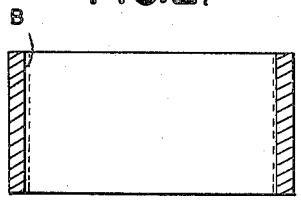
Figure 2 is a similar view after the operation of broaching the inner surface of the shell.
Figure 3:
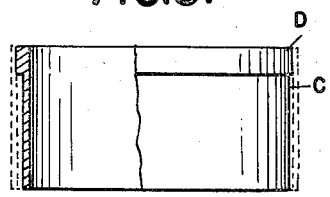
Figure 3 is a sectional elevation showing one step in the operation of forming the locking lugs.
Figure 4:
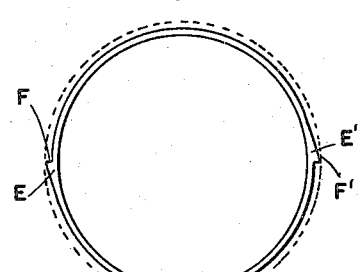
Figure 4 is a plan view showing in dotted and full lines respectively, the blank as in Figure 3 and after broaching to form the lugs.
Figure 5:
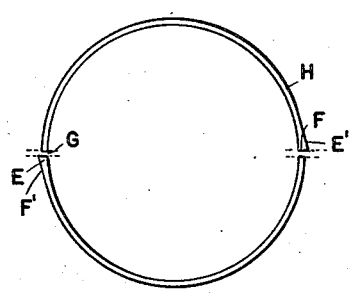
Figure 5 is a similar view illustrating the severing of the blank to form the half sections.
Figure 6:
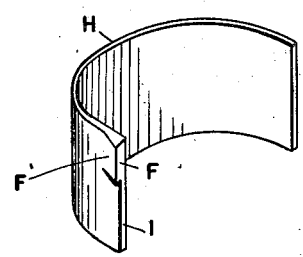
Figure 6 is a perspective view of one of the completed half sections.
Figure 7:
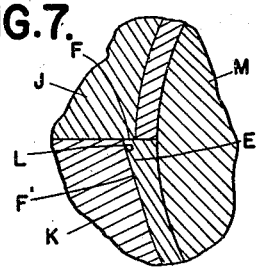
Figure 7 is a section through the bearing and journal at the point of location of the locking lugs.

Referring now to the drawing, the blank A is an annulus formed of suitable bearing material such for instance as bronze and either by casting or any other suitable method. The first operation is the rough fashioning of the inner surface preferably by broaching, as indicated at B (Figure 2).

The outer surface is then fashioned preferably by turning to form a portion C of substantially the external diameter desired and a narrow annular portion D of greater diameter sufficient for forming the locking lugs. The next operation is preferably formed by broaching which removes all of the annulus D with the exception of the portions E and E' on diametrically opposite sides thereof, which portions constitute the locking lugs. These are preferably formed with a square shoulder F and an inclined surface F' which is substantially tangent to the outer surface of the remainder of the bearing. The blank is then severed by sawing or otherwise, as indicated at G, the cut being taken adjacent to the square shoulders F and forming half sections as designated by H. To obtain the exact dimensions desired and also to form smooth outer and inner surfaces, these are subjected to a burnishing or other finishing operation subsequent to the rough fashioning of the same. This is also true of the edges I on opposite sides of the split, so that at the completion of the operations the section will be of finished size.

The outer box or holder for the shell is formed in any suitable way with the plane of separation between the sections J and K thereof coinciding with the plane of separation between the shell sections. One of these box sections, such as K, has a recess L formed in its inner surface preferably by milling, which recess corresponds exactly to the section of the lug E. Thus, when the journal M is engaged with the bearing the lug E will be held in engagement with the recess L and with its square shoulder F engaging the box section J. This will preclude any turning of the shell within the box, for the thickness of the shell at the point of location of the lug E is greater than at any other point and correspondingly greater than the space between the journal and the inner face of the box.

While we have described the bearing as having the lugs E located at a particular point, it is obvious that these could be placed at any point desired, and also that a plurality of lugs could be formed on the same bearing. To compensate for the metal removed in the severing of the annular blank the internal and external diameters thereof are slightly greater than the corresponding diameters of the box and journal. Thus, the segmental sections when pressed into the box sections will be slightly contracted and the edges will be brought into contact with each other.

What we claim as our invention is:

1. The method of forming bearing shells provided with one or more locking lugs, comprising the steps of broaching an annulus to make the inner surface thereof approximately the required diameter, turning a portion of the outer surface of said annulus to approximate the required external diameter and to leave an annular portion of greater diameter sufficient for forming one or more locking lugs, broaching all but a predetermined portion of the annular portion just mentioned to provide one or more locking lugs, burnishing the inner and outer surfaces of said annulus to the exact dimensions desired, and cutting the annulus at predetermined points to provide half sections.

2. The method of forming bearing shells provided with one or more locking lugs, comprising the steps of broaching an annulus to make the inner surface thereof approximately the required diameter, turning a portion of the outer surface of said annulus to approximate the required external diameter and to leave an annular portion of greater diameter sufficient for forming one or more locking lugs, broaching all but a predetermined portion of the annular portion just mentioned to provide one or more locking lugs, and cutting the annulus at predetermined points to provide half sections.

3. The method of forming bearing shells provided with one or more locking lugs, comprising the steps of broaching the interior of the annulus to make the inner surface thereof approximately the required diameter, turning the major portion of the outer surface of the annulus to approximate the required external diameter and to provide a relatively narrow portion of greater diameter sufficient for forming one or more locking lugs, removing all of the annular portion just mentioned except parts at substantially diametrically opposite points thereof to provide locking lugs, and cutting the annulus adjacent said points to form half bearings.

4. The method of forming bearing shells provided with one or more locking lugs, comprising the steps of broaching an annulus to make the inner surface thereof approximately the required diameter, turning the major portion of the outer surface of the annulus to approximate the required external diameter and to provide a relatively narrow annular portion of greater diameter sufficient for forming one or more locking lugs, and broaching all but a predetermined portion of the annular portion just mentioned to provide one or more locking lugs.

5. The method of forming bearing shells provided with one or more locking lugs, comprising the steps of broaching a metal blank to make the inner surface thereof approximately the required internal diameter, turning the major portion of the outer surface of the blank to approximately the required external diameter and to provide a relatively narrow circumferentially extending portion of greater diameter sufficient for forming one or more locking lugs, broaching all of the narrow portion just mentioned except parts at spaced points thereof to provide locking lugs, and cutting the blank at predetermined points to form half bearings.

6. The method of forming bearing shells provided with one or more locking lugs, comprising the steps of removing metal from the inner surface of a metal blank to provide an inner surface of approximately the required internal diameter, removing metal from the major portion of the outer surface of the blank to provide an outer surface of approximately the required external diameter and to provide a relatively narrow portion of greater diameter sufficient for forming one or more locking lugs, and removing all but a predetermined part of the narrow portion just mentioned to provide one or more locking lugs.

DANIEL McKERCHER.
GEORGE F. YAGER.